United States Patent [19]

Roth

[11] Patent Number: 5,004,972

[45] Date of Patent: Apr. 2, 1991

[54] INTEGRATED POWER LEVEL CONTROL AND ON/OFF FUNCTION CIRCUIT

[75] Inventor: Roger R. Roth, Minnetonka, Minn.

[73] Assignee: Honeywell Inc., Minneapolis, Minn.

[21] Appl. No.: 457,221

[22] Filed: Dec. 26, 1989

[51] Int. Cl.[5] .......................... G05F 5/02; G05B 24/02

[52] U.S. Cl. .................................... 323/320; 323/300; 323/325; 323/905; 315/194; 315/291; 315/DIG. 4

[58] Field of Search ................................ 323/320–326, 323/300, 905; 315/291, 307, 294, 194, 195, DIG. 4

[56] References Cited

U.S. PATENT DOCUMENTS

| | | | |
|---|---|---|---|
| 4,563,592 | 1/1986 | Yuhasz et al. . | |
| 4,612,478 | 9/1986 | Payne . | |
| 4,628,230 | 12/1986 | Krokaugger | 315/DIG. 4 X |
| 4,651,060 | 3/1987 | Clark . | |
| 4,668,877 | 5/1987 | Kunen . | |
| 4,689,547 | 8/1987 | Rowen et al. | 315/DIG. 4 X |
| 4,701,680 | 10/1987 | Alley et al. . | |
| 4,704,563 | 11/1987 | Hussey | 315/DIG. 4 X |
| 4,712,045 | 12/1987 | Van Meurs | 315/DIG. 4 X |
| 4,717,863 | 1/1988 | Zeiler | 315/DIG. 4 X |
| 4,745,351 | 5/1988 | Rowen et al. | 315/DIG. 4 X |

*Primary Examiner*—Steven L. Stephan
*Assistant Examiner*—Emanuel Todd Voeltz
*Attorney, Agent, or Firm*—Edward Schwarz

[57] ABSTRACT

A load power control circuit which adjusts the level of power provided by a load in response to changes in the impedance across control terminals includes a control circuit which disconnects the load from the power source when the voltage across the control terminals in within a certain range. The control circuit is particularly useful in controlling fluorescent light fixtures controlled by electronic ballasts because the control circuit avoids the need for a separate on/off switch for the fixtures.

3 Claims, 1 Drawing Sheet

INTEGRATED POWER LEVEL CONTROL AND ON/OFF FUNCTION CIRCUIT

BACKGROUND OF THE INVENTION

For certain electrical devices it is advantageous to control or adjust the level of power supplied to them. In these devices what may be generally described as a load power control circuit provides the function of allowing a user to provide this control by adjustment of an element, for example a potentiometer, in the circuit.

There are a number of situations where this need arises. In a particular application of interest, it is desirable to be able to allow manual control of the illumination level provided by fluorescent lighting. In the most recent types of such dimmable fluorescent lighting, power is provided to each individual fixture through what is called an electronic ballast. In one particular commercial design, the dimming level is adjusted by varying the value of an external variable control impedance which is connected across a pair of the ballast's control terminals. There is, internal to the ballast, a current source in parallel with a resistance across the pair of ballast control terminals. By varying the control impedance across the control terminals a dimming control signal voltage is created across the control terminals which is sensed by other elements of the ballast's internal circuitry and in response to which vary the illumination level provided by the fixture of which the ballast is a part. The control voltage across the control terminals can vary from about 1 volt at minimum illumination to about 10 v. at full brightness. Each ballast provides power to a pair of fluorescent bulbs.

It is possible, by ganging the control terminals for the ballasts across the control impedance circuit terminals, to connect a number of individual ballasts' control terminals to a single control impedance circuit. In this commercial design, the control impedance circuit includes active semiconductor elements which make the control characteristics of the impedance circuit as a function of its adjustment potentiometer resistance nearly insensitive to the number of ballasts controlled by the impedance circuit. That is, the illumination level of individual fixtures is very nearly the same for a given mechanical position of the control impedance circuit's adjustable element regardless of the number of ballasts controlled by the impedance.

The control impedance circuit has the capability of controlling the dimming for as many as 60 individual ballasts, by ganging the control terminals for the ballasts across the control impedance circuit terminals. The limitation on the number of ballasts which may be controlled by a single control impedance is directly related to the ability of the impedance to sink the current which each individual ballast produces at its control terminals.

At the present time, the on/off function for a fixture is provided by a physically separate switch for connecting and disconnecting the fixture to line voltage. This is because electrical codes prohibit placing within a single electrical wiring box the high (117 or 277 v.) building wiring voltage and the low ballast control voltage. Therefore, it is necessary to provide a second wiring box connected with load wiring to the fixture and adjacent to the box containing the control impedance in which is placed an on/off switch which controls the fixture. This being inconvenient and expensive, a means of combining the dimming and on/off functions is desirable.

In certain applications it is useful to be able to control more than the designed-for number of 60 fixtures from a single impedance. While 60 fixtures at first blush appears to be a large number, many commercial and office buildings have literally hundreds of fluorescent fixtures whose control by a single control element is sometimes desirable. To provide a control impedance with greater capability than the 60 ballasts requires a built-in power supply which increases its production and installation cost. It is desirable to devise some means of avoiding these aforementioned limitations. In particular, a means for transparently interfacing between a single control impedance and a large number of fluorescent fixtures would be very useful.

Therefore it is desirable to devise some means of avoiding these aforementioned limitations. In particular, a means for combining the dimming and on/off functions for large numbers of fluorescent fixtures within a single control unit would be very useful.

There are a number of references pertaining to an on/off control integrated with a dimming circuit for controlling the amount of electric power applied to a load. In the particularly pertinent electric lamp dimming control field, U.S. Pat. No. 4,701,680 shows an on/off switch in the collector circuit of the transistor which performs the actual dimming function. U.S. Pat. No. 4,563,592 has a number of switches connected in parallel for connecting or disconnecting the control voltage to the circuit which controls the flow of power to a light fixture load. Other references which pertain to lamp dimming circuits having relevant features are U.S. Pat. Nos. 4,612,478; 4,628,230; 4,645,979; 4,651,060; 4,668,877; 4,704,563; 4,712,045; and 4,717,863.

A discussion of a particular aspect of the theory of circuit equivalence is also helpful in understanding this invention. The concept of a current source is well known to those skilled in the electronic arts, and indeed, the commercial embodiment of the electronic ballast mentioned above uses a current source in parallel with a resistor as the power source at its input terminals. It is known that one can substitute a current source in parallel with a resistor for a voltage source in series with a resistor of a different value to provide equivalent electrical characteristics. Therefore, for the remainder of this discussion, one should consider a current source in parallel with a resistor of some value to be interchangeable with a voltage source in series connection with a resistor. In particular, use of the term "voltage source" is not meant to limit the disclosure involved to that specific embodiment, and the current source equivalent should be understood to be included in the term.

BRIEF DESCRIPTION OF THE INVENTION

As mentioned above, in certain power control systems particularly adapted for varying the power supplied to a fluorescent light fixture, and hence to vary the illumination from the fixture, the level of illumination is controlled by adjusting the external impedance across control terminals of a power circuit which regulates the power to the load. The power circuit provides at its control terminals a voltage which varies in response to the control impedance across the control terminals. The invention comprises a circuit for switching the power from the load responsive to presence across the control terminals of a voltage within a preselected voltage range.

This improvement comprises a voltage sensor receiving the voltage across the power circuit control terminals and providing an output signal having a first preselected voltage responsive to the voltage across the power circuit control terminals falling within the preselected range and a second preselected voltage otherwise. There is also provided a switch means having a pair of power terminals for series connection with the electric power circuit so that power for the load must flow through the switch means and its power terminals and may be interrupted by the switch means. The switch means has a control terminal which receives the voltage sensor's output signal and responsive to the first preselected voltage forms an electrical connection between the pair of power terminals to allow power to flow to the load. When the second preselected voltage is applied to the switch means' control terminal the switch means opens and breaks the electrical connection between the pair of power terminals preventing power from flowing to the load.

There are a number of purposes and advantages which this invention achieves. Among them are first the convenience for the user of an on/off function incorporated in the dimmer control for a light fixture.

A second purpose is to permit the on/off function and the dimmer function to be contained within a single electrical box.

A third purpose is to permit a single on/off switch to control a number of light fixtures or other loads.

Other purposes and advantages will become apparent from the description of the invention which follows.

DESCRIPTION OF THE PREFERRED EMBODIMENT

Figure 1:
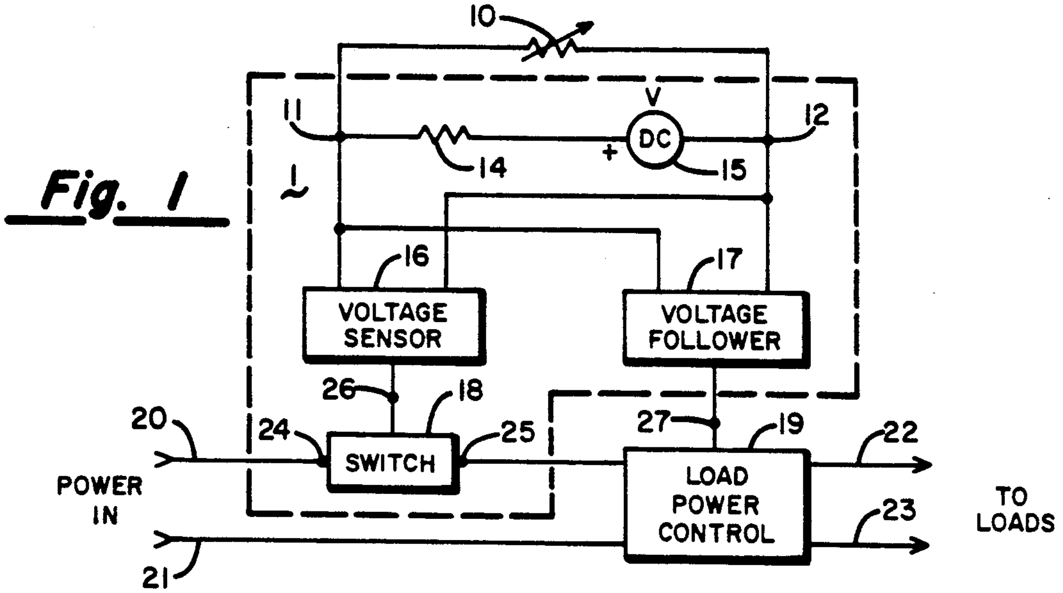
FIG. 1 is a block diagram of an integrated power and on/off control for a load such as a light fixture.

The block diagram shown in FIG. 1 is a block diagram of a circuit providing power adjustment to a load along with an on/off function. The user of the load can adjust power and turn it on and off by properly setting an impedance 10. While this impedance is shown as a simple variable resistor, in fact its commercial embodiment is instead a circuit including active electrical components, the details of which are not relevant to this invention. Power for these active components are received at control terminals 11 and 12 from a DC voltage source 15 in series with a resistor 14.

The on/off and power level control functions are shown as individual elements in FIG. 1, with the on/off function provided by a voltage sensor 16 and a switch 18. When switch 18 is closed, electric current passes between switch terminal 24 and switch terminal 25, through load power control circuit 19, and through terminals 22 and 23 to the load. The power control function is performed by a voltage follower circuit 17 supplying a control signal through conductor 27 to load power control circuit 19. The load power control circuit 19 in the embodiment of this invention pertaining to fluorescent lighting controls comprises the electronic ballast previously discussed.

In the design of a commercial embodiment, it is convenient to combine the voltage source 15, the resistor 14, the voltage sensor 16 and switch element 18, and the voltage follower circuit 17 in a single modular unit 1 permitting power to the load to be adjusted and switched on and off under control of the variable impedance 10 only.

Switch 18 under the control of voltage sensor 16 disconnects the load from power terminals 20 and 21 in response to voltage between terminals 11 and 12 falling within a preselected range and connects the load to power terminals 20 and 21 if the voltage between terminals 11 and 12 is outside of this range. In the commercial embodiment contemplated, this preselected voltage range is from about 0.1 v. to about 0.5 v. When the voltage between terminals 11 and 12 is from 0 to 0.5 volt, voltage sensor 16 provides a signal voltage at terminal 26 to which switch 18 responds by opening the connection between terminals 24 and 25. When the voltage between terminals 11 and 12 is above approximately 0.8 v., switch 18 makes electrical connection between terminals 24 and 25. In the range between 0.5 and 0.8 v., the condition of switch 18 will not change. To achieve these voltages, the value for the commercial embodiment of impedance 10 ranges from about 40 Ω to about 24,000 Ω depending on the illumination level selected and the number of load power control circuits 19 or equivalents controlled by the impedance 10.

The voltage produced on terminal 27 of voltage follower circuit 17 in the preferred embodiment, precisely emulates or mirrors the voltage between terminals 11 and 12 of impedance 10. It is also preferable that the input interface for these voltage follower circuits 17 be compatible with that of the load power control circuits 19 so that the same commercial embodiment of impedance 10 may be interchangeably connected to the input terminals of either. The input interface for load power circuit 19 includes a DC current source and a parallel resistor. The values of resistor 14 and the series voltage source 15 are chosen so that the input interface of voltage follower circuit 17 is compatible with the input of load power control circuit 19. Preferably, the design of voltage follower circuit 17 is such that a substantial number of these voltage follower circuits may be gang connected at their input or control terminals 11 and 12 to impedance 10. This allows many more load power control circuits 19 to be controlled by a single impedance 10 than if no voltage follower circuits 17 were present. Further, it is preferable that the input interface for voltage follower circuit 17 be compatible with the input of load power control circuit 19 so that both types of circuits may be intermixed at their input terminals to the impedance 10.

Since the embodiment of voltage follower circuit 17 allows the commercially available variable impedance 10 to drive as many as ten voltage followers 17, it can be seen that use of a multiple number of these voltage follower circuits 17 allows as many as 600 individual load power control circuits 19 to be controlled by a single impedance 10 as opposed to the 60 that can be controlled by a single impedance 10 without the interposition of the voltage follower circuit 17.

ON/OFF CONTROL

Figure 2:
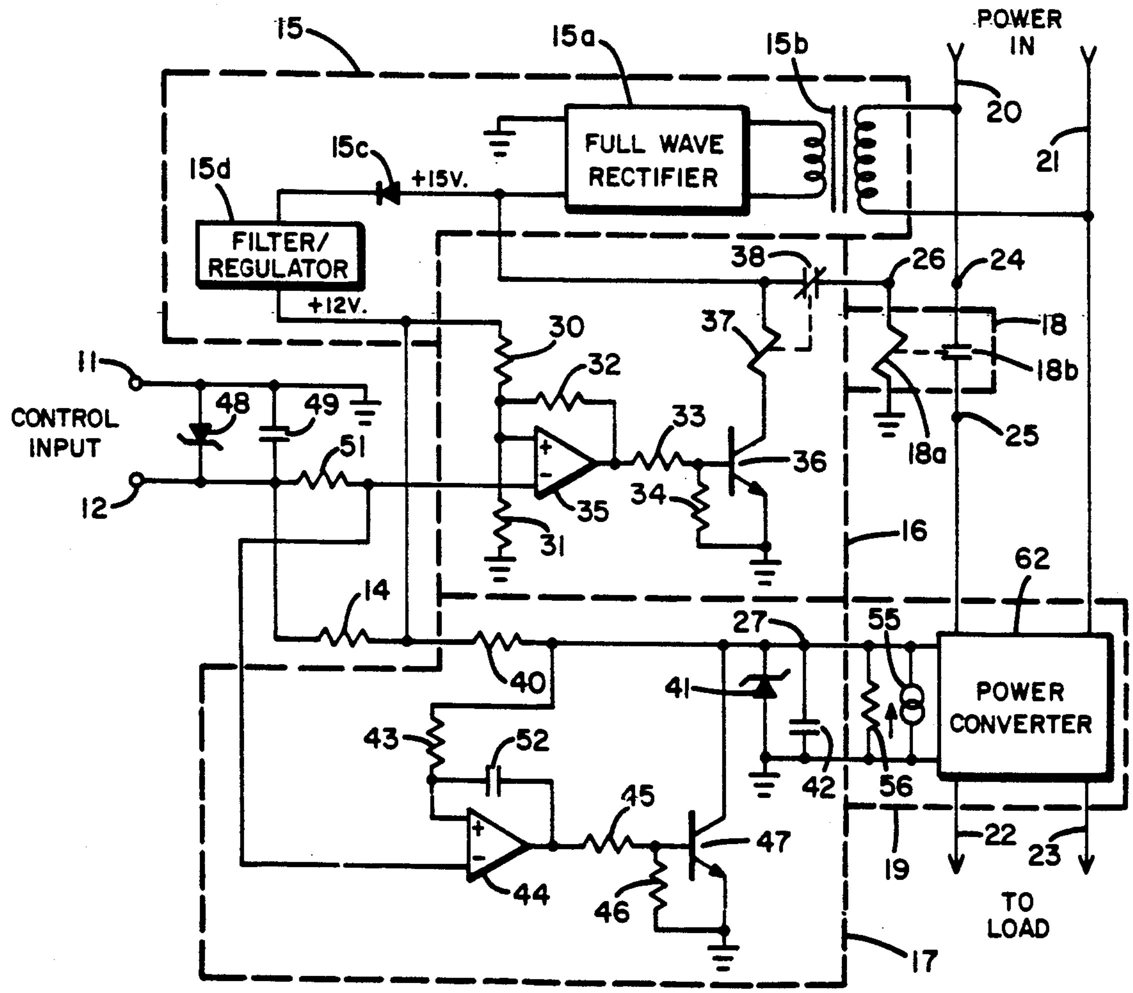
FIG. 2 is a circuit diagram for the on/off and power adjusting function of the block diagram of FIG. 1.

The individual circuit components of the three block elements, sensor 16, voltage follower 17 and switch 18 combined in the single modular unit 1 are shown in FIG. 2. In FIG. 2 DC voltage source 15 is shown as comprising a transformer 15*b* receiving power from terminals 20 and 21 and providing a 15 volt AC output to full wave rectifier 15*a*. The output of full wave rectifier 15*a* is provided to a filter/regulator element 15*d* through coupling diode 15c. The output of filter/-regulator element 15d is +12 v. DC provided to the resistor 14 for the control signal and to power the operational amplifiers 35 and 44. The unregulated and unfiltered DC output from rectifier 15a is used for certain functions of the switch element 18.

Turning first to the structure of switch element 18, the upper end of the voltage range defining the off state for the load is provided by a voltage divider comprising resistors 30 and 31 connected between the output of filter/regulator element 15d and ground. The values of resistors 30 and 31 are chosen such that approximately 0.5 v. appears at the connection between them. The voltage produced at the connection between resistors 30 and 31 is applied to the + input terminal of an operational amplifier 35. Ground, 0 v., forms the lower end of the off state voltage range.

For the purposes of the discussion which follows involving both operational amplifiers 35 and 44, these devices may be taken to be high gain voltage amplifiers having a differential input. By a differential input is meant that a variable or control voltage can be applied to either or both of the + and − terminals. The output of each operational amplifier 35 and 44 is a voltage which is a large multiple, say on the order of several hundred to several thousand, of the difference of the voltage between the plus and minus input terminals. When the − terminal voltage exceeds the voltage on the + terminal the output is simply driven to 0 v. (ground). Because of the large voltage amplification, and the fact that the output voltage can never exceed the voltage of the power applied to these amplifiers, there is a relatively narrow range of input voltage differences over which the output is between the 0 v. and 12 v. extremes.

The − terminal input receives the control voltage applied to terminal 12 through resistor 51. Resistor 51 is present merely to attenuate potential static discharges presented on terminal 12. Because its resistance may be on the order of 10,000 ohms or so, very much lower than the input impedance of amplifier 35, it has no effect on the response of amplifier 35.

The voltage across control input terminals 11 and 12 is supplied by the output of filter/regulator element 15d applied through resistor 14. Thus it can be seen that as control impedance 10 is changed across terminals 11 and 12 the voltage at terminal 12 will change, increasing as the control impedance value increases and decreasing as control impedance decreases. Zener diode 48 and capacitor 49 are included simply for further protection against static electricity discharges which have the potential to damage the semiconductor elements within amplifiers 35 and 44.

The output of amplifier 35 is applied to a pair of series-connected resistors 33 and 34. Resistor 33 limits current flow from amplifier 35, and these two resistors also function as a voltage divider to assure that transistor 36 is cut off when the output of amplifier 35 is low. A feedback resistor 32 connects the output of amplifier 35 to the + input terminal of amplifier 35. The purpose of resistor 32 is to create a dead band which stabilizes the response of amplifier 35 so that small variations in the − terminal voltage when only slightly more negative (within about 0.3 v.) than the voltage on the + terminal will not cause the output of amplifier 35 to change.

The voltage output at the connection between resistors 33 and 34 is applied to the base of an NPN transistor 36. The emitter of transistor 36 is connected to ground and the collector is connected to the winding 37 of a first relay. The first relay has normally closed contacts 38 controlled by winding 37, so that contacts 38 conduct when transistor 36 is cut off and no current flows through winding 37. Unregulated power from full wave rectifier 15a is applied through contacts 38 to a terminal 26 and then to the winding 18a of a second relay comprising the switch 18 discussed in connection with FIG. 1. Winding 18a controls normally open contacts 18b which are connected between terminals 24 and 25. It can be seen that when contacts 18b are closed power can flow from terminals 20 and 21 to load terminals 22 and 23 through the power converter element 62 shown.

Circuit operation is controlled by the value of the impedance connected between terminals 11 and 12. In the commercial embodiment contemplated the 12 v. potential applied to terminal 12 through resistor 14 is dropped by the control impedance 10 so that voltage varies from a maximum of 10 v. to a minimum of 0.1 to 0.2 v. When voltage at terminal 12 exceeds the 0.5 v. applied to the + input terminal of amplifier 35, its output to resistors 33 and 34 is also close to 0 v. so that the voltage at the base of the transistor 36 is also 0 v. 0 v. applied to the base of transistor 36 causes transistor 36 to be cut off so that no current flows between its collector and emitter and therefore no current flows through the first relay's winding 37. Therefore, contacts 38 are closed and current flows through the winding 18a which holds contacts 18b closed. Thus power can flow to load terminals 22 and 23 through power converter 62.

When voltage at terminal 12 is below 0.5 v. the output of amplifier 35 is at approximately 10 v. The current supplied to the base of transistor 36 through resistor 33 drives transistor 36 into conduction. When transistor 36 conducts, then winding 37 causes contacts 38 to open so they no longer conduct. When contacts 38 do not conduct then no current is allowed to flow to terminal 26 and through winding 18a, causing contacts 18b to open, disconnecting load terminals 22 and 23 from the power terminals 20 and 21. Setting the control impedance 10 to a value which reduces the voltage across terminals 11 and 12 to less than 0.5 v. thus in effect functions to the perception of the user as an off position of the impedance 10.

Because of the presence of an inductive current surge from the collapsing field of winding 18a while contacts 38 are opening which may cause arcing across contacts 38, it is preferable to include a diode (not shown) across winding 18a to dissipate this current surge and prevent damage to contacts 38. This is a well known design expedient.

As mentioned in connection with FIG. 1, it is important that there be an appreciable range between the voltage across terminals 11 and 12 at which contacts 18b are opened, and the voltage at which contacts 18b are closed so they conduct. This is the function of feedback resistor 32 and the dead band that it creates. When the − input terminal of amplifier 35 falls below 0.5 v., the output of amplifier 35 rises to approximately 10 v. Resistor 32 is chosen of a size sufficient to pull up the voltage on the + input of amplifier 35 to approximately 0.8 v. or so. When the impedance 10 increases in value and the voltage across terminals 11 and 12 increases as well, it must reach the 0.8 v. level before the output of amplifier 35 drops to around 0.5 v. to cut off transistor 36 and eventually cause contacts 18b to close. Thus, resistor 32 shifts the voltage at the + input terminal of amplifier up a few tenths of a volt when the voltage on the − terminal of amplifier is low, and pulls the voltage on the + terminal of amplifier 35 down when the amplifier 35 output is low. Accordingly, resistor 32 adds stability so that normal variations in the voltage across terminals 11 and 12 resulting from fluctuations in power supply voltage or impedance 10 will not trigger amplifier 35 to change its output other than when the voltage at terminal 12 is changed by manual adjustment of impedance 10.

POWER ADJUSTMENT

Voltage follower circuit 17 and load power control circuit 19 permit one to adjust the power delivered to the load. Again, the impedance between terminals 11 and 12 as measured by sensing the voltage across these terminals control the level of power delivered to the load. The design of circuits 17 and 19 is such that the amount of power delivered to the load is highest when the voltage between terminals 11 and 12 is highest and becomes lower as the voltage and impedance across these terminals becomes lower.

The voltage at terminal 12 and provided through resistor 51 is applied to the − input terminal of amplifier 44 also. A feedback voltage is applied to the input terminal of operational amplifier 44 through resistor 43. The source of this feedback voltage will be identified later. The output of amplifier 44 is applied to a voltage divider circuit comprising resistors 45 and 46. The output voltage from the voltage divider at the connection between the two resistors 45 and 46 is applied to the base of a transistor 47. Transistor 47 functions as a variable impedance to hold the voltage at its collector very close to the voltage on terminal 12. The voltage at the collector of transistor 47 forms the feedback voltage mentioned just above provided to the + input terminal of operational amplifier 44. A capacitor 52 connected between the + input terminal and the output of operational amplifier 44 provides stability of the amplifier 44 output. As the transistor 47 collector voltage increases for a given control terminal 12 voltage, transistor 47 is driven more strongly into conduction which reduces its collector voltage. Accordingly, it can be seen that the voltage at the collector of transistor 47 and terminal 27 will always be a few millivolts above the input terminal 12 voltage applied to the − input terminal of amplifier 44. It thus can be seen that the operation of load power circuit 19 when driven by voltage follower circuit 17 is essentially identical to its operation if the variable impedance connected between terminal 11 (ground) and terminal 12 were shifted from that point to replace the voltage follower output connections at terminal 27 and terminal 64 (ground) of control circuit 19.

Zener diode 41 and capacitor 42 provide protection against static electricity voltage surges at the output of voltage follower circuit 17 in the same manner that similar components 48 and 49 provide similar input protection.

Current source 55 and resistor 56 provide power for the variable control impedance which for this invention's purpose is connected across the input terminals 11 and 12 instead of being attached to terminal 27 as originally intended. Current source 55 and resistor 56 together with power converter 62 comprise the load power control circuit 19 shown in FIG. 1. The design of the voltage follower circuit 17 allows complete compatibility between the output of circuit 17 and input of circuit 19.

The following component values or designations for these two circuits are preferred:

| | |
|---|---|
| Resistors 14, 40, 34, 46<br>61 | 4,700 Ω |
| Rectifier 15a | formed of type<br>IN4004* diodes |
| Diode 15c | type 1N4004 |
| Resistor 30 | 240,000 Ω |
| Resistors 31, 33, 45, 43,<br>51 | 10,000 Ω |
| Resistor 32 | 1,000,000 Ω |
| Operational amplifiers<br>35, 44 | type LM358N* |
| Transistors 36, 47 | type 2N3904* |
| Capacitors 42, 48, 52 | .1 mfd. |
| Zener diodes 41, 48 | 1N4740A* 10 v., 1 w. |
| First relay | Aromat Corp.**,<br>type VC20-la-DC12V |
| Second relay | Aromat Corp., type<br>HD1E-M-DC12V |

*Semiconductor designations are generic.
**A member of the Matsushita group.

What I wish to protect by letters patent is:

1. In an electric power control system including a load power control circuit for varying the level of power supplied to a load by a power source according to the value of a variable impedance connected across control terminals of said load power control circuit, said load power control circuit of the type providing at its control terminals an output voltage varying in response to the value of the impedance across the control terminals, an improvement for switching the power from the load responsive to a preselected voltage across the control terminals, and comprising (a) a voltage sensor receiving the voltage across the load power control circuit control terminals and providing an output signal having a first preselected voltage responsive to the load power control circuit control terminals voltage falling within a preselected range, and a second preselected voltage otherwise; and (b) a switch means having a pair of power terminals for series connection with the load power control circuit, the power source, and the load and having a control terminal receiving the voltage sensor's output signal and responsive to the first preselected voltage, for forming an electrical connection between the pair of power terminals, and responsive to the second preselected voltage, for opening the electrical connection between the pair of power terminals.

2. The system of claim 1, wherein the voltage sensor comprises (a) a constant voltage source element having a preselected output voltage level; and (b) an amplifier receiving the voltage across the load power control circuit control terminals and the output of the constant voltage source element, said amplifier providing the output signal with the first preselected voltage when the load power control circuit control terminals voltage is greater than the preselected output voltage level, and providing the output signal with the second preselected voltage when the load power control circuit control terminals voltage is less than the preselected output voltage level.

3. The system of claim 2 including a power supply, wherein the switch means includes a transistor receiving the output signal of the amplifier at its control terminal and conducting between its power terminals responsive to the output signal's second preselected voltage, a first normally closed relay whose winding is in series connection with the transistor power terminals across the power supply output, and a second normally open relay whose winding is in series connection with the contacts of the first relay across the power supply output, and said second relay contacts connected between the switch means power terminals.

* * * * *